(No Model.) 2 Sheets—Sheet 1.

J. W. HYATT.
COAGULANT FEEDER.

No. 417,036. Patented Dec. 10, 1889.

Attest:
L. Lee.
F. C. Fischer.

Inventor.
John W. Hyatt, per
Crane & Miller, Attys.

(No Model.) 2 Sheets—Sheet 2.

J. W. HYATT.
COAGULANT FEEDER.

No. 417,036. Patented Dec. 10, 1889.

Attest:
L. Lee
J. C. Fischer

Inventor.
John W. Hyatt, per
Crane & Miller, Attys.

UNITED STATES PATENT OFFICE.

JOHN W. HYATT, OF NEWARK, NEW JERSEY, ASSIGNOR TO THE HYATT PURE WATER COMPANY, OF NEW JERSEY.

COAGULANT-FEEDER.

SPECIFICATION forming part of Letters Patent No. 417,036, dated December 10, 1889.

Application filed May 11, 1889. Serial No. 310,374. (No model.)

*To all whom it may concern:*

Be it known that I, JOHN W. HYATT, a citizen of the United States, residing at Newark, Essex county, New Jersey, have invented certain new and useful Improvements in Filter Reagent-Feeders, fully described and represented in the following specification and the accompanying drawings, forming a part of the same.

The object of this invention is to feed a chemical reagent into a filter or into any liquid under pressure.

The device is provided with a flexible motor-diaphragm actuated by the variations of pressure in a reciprocating pump in which an intermittent pressure is induced by the movement of a piston, and is especially adapted for use where the pump delivers the water into the pipe, filter, or other receptacle under pressure to which the reagent must be delivered. It is obvious that in such case the pressure upon such motor-diaphragm would not exceed that in the pump or receptacle under pressure and would not suffice to produce motion; and my present invention consists in combining with the motor-diaphragm a pump-diaphragm of smaller area, with means for transmitting the pressure of the larger diaphragm to the smaller, so that the intermittent pressure upon the motor-diaphragm may operate efficiently to propel the fluid against the frictional resistance to which it is exposed into the pipe or receptacle under pressure.

The invention is obviously adapted to any use for which its construction fits it, and I do not limit myself merely to the use described herein.

Figure 1:
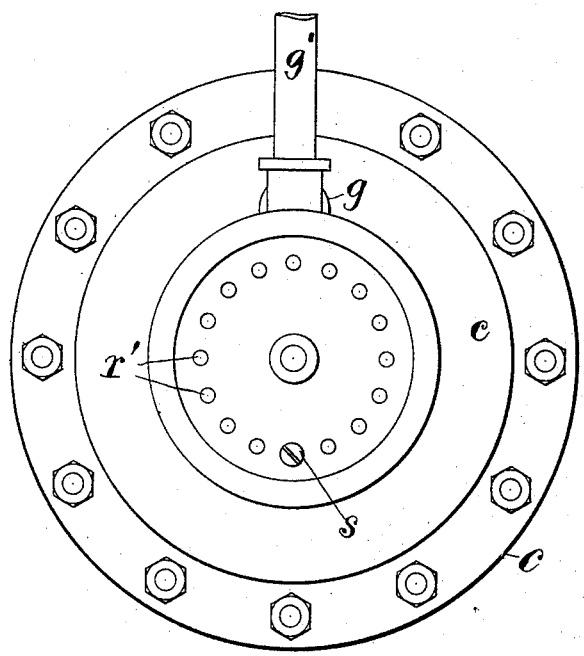
Figure 2:
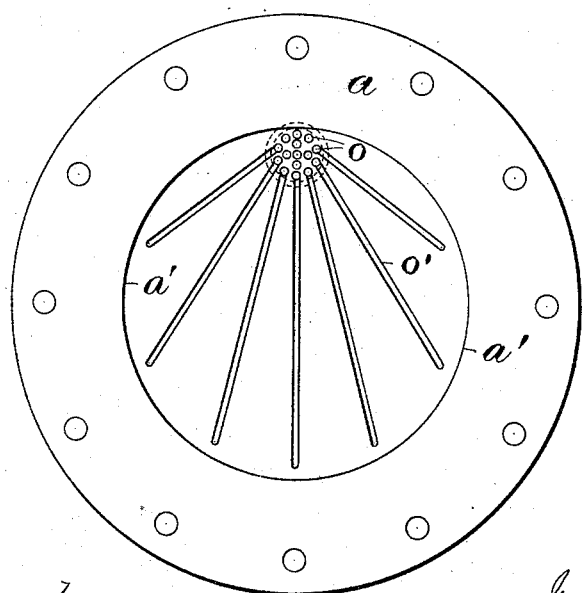
Figure 3:
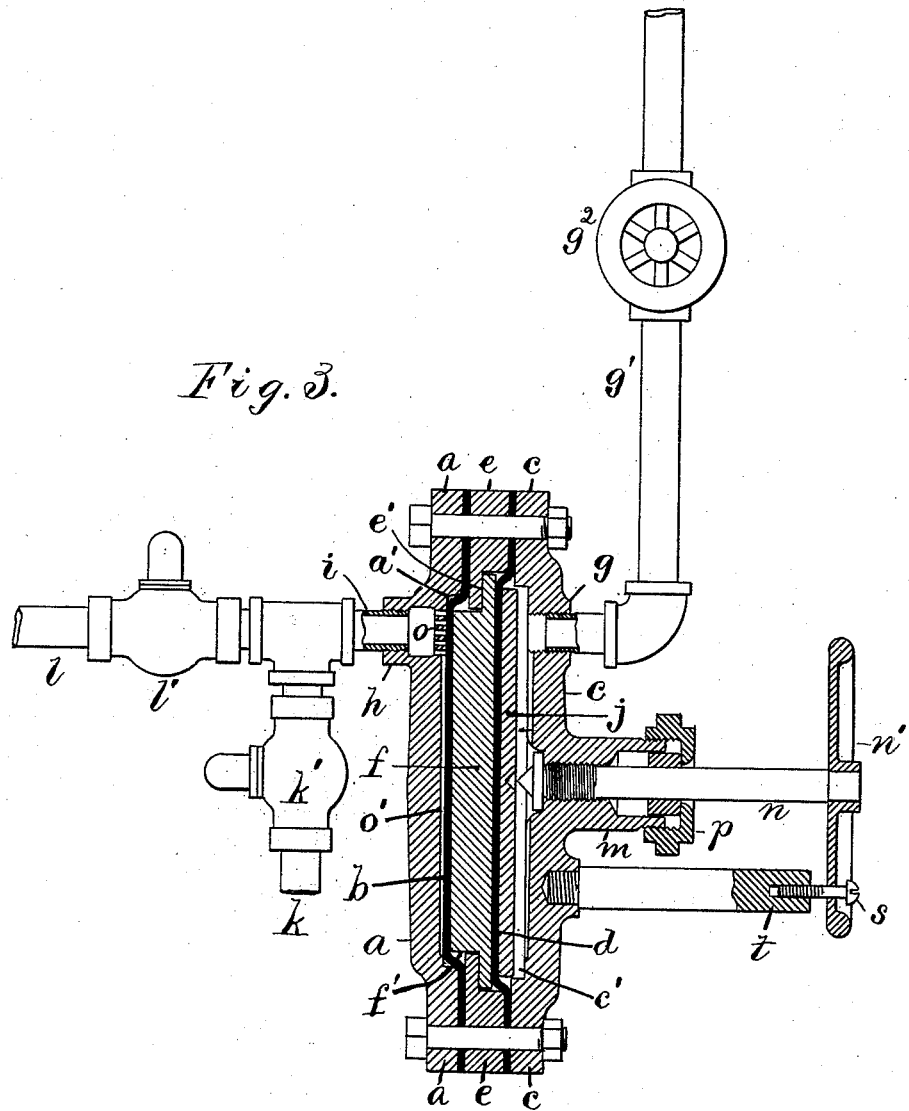

In the annexed drawings, Figure 1 is an end elevation of the feeder. Fig. 2 is an inside view of one of the casings; and Fig. 3 is a vertical section on the center line of Fig. 1, the pipes and valves and parts not hatched in Fig. 3 not being shown in section.

$a$ is the casing for the pump-diaphragm $b$, and $c$ the casing for the motor-diaphragm $d$, the casings being clamped together upon the margins of the diaphragms and upon an intermediate ring $e$, the space inside the ring forming, in connection with circular recesses $a'$ and $c'$ in the two casings, suitable chambers in which the diaphragms vibrate. A transmitting-disk $f$ is inserted between the diaphragms, and is formed with an annular rabbet $f'$ around its margin to reduce its area upon the side next the pump-diaphragm $b$. The recess $a'$ is of smaller diameter than the recess $c'$ to limit the flexible portion of the diaphragm $b$, and the ring $e$ is formed with a rabbet at one side adjacent to the diaphragm, thus producing a flange $e'$ upon the side next the smaller diaphragm to clamp its smaller periphery against the casing $a$.

The casing $c$ is formed with pipe-nozzle $g$, shown provided with a pipe $g'$ and cock $g^2$, for connecting it with the pump-cylinder, in which the intermittent pressure is produced by the movement of its piston, and the casing $a$ is shown formed with a nozzle $h$, to which is connected a pipe $i$, having branches $k$ and $l$, provided with check-valves $k'$ and $l'$. The pipe $k$ would in practice be connected with a receptacle of the chemical reagent, as in similar constructions, and the pipe $l$ with the fluid under pressure to which the reagent is delivered. A grating $o$, connected with grooves $o'$ inside the casing $a$, is applied to the outlet of the nozzle $h$, to prevent the pressure upon the diaphragm from forcing it injuriously into the aperture.

The disk $f$ operates to transmit to the other diaphragm any pressure operating upon the outside of either diaphragm, and the disk is in practice pushed back and forth by the alternate operation of the pump-pressure acting through the pipe $g'$ and atmospheric pressure operating upon the smaller diaphragm through the pipe $k$.

The operation of the apparatus is as follows: The atmospheric pressure is permitted to operate upon the surface of the reagent supplied through the pipe $k$. The diaphragm $d$ is thus moved inward when the pressure occurs in the pipe $g'$, and is moved outward by the atmospheric pressure upon the diaphragm $b$ when the vacuum or diminished pressure occurs in the pipe $g'$. A supply of the chemical thus flows through the check-valve $k'$ into the diaphragm $b$ at each reciprocation of the diaphragm $d$, and is discharged through the check-valve $l'$ by the inward movement of the diaphragm $d$ under the pressure operating through the pipe $g'$. The diaphragm $d$ is not only of larger area than the diaphragm $b$, but the transmitting-disk $f$ is of different area upon its opposite sides, so that it presents a smaller area to the pump-diaphragm $b$ than to the motor-diaphragm, from which it receives its movement. With an equal pressure per minute of area upon each diaphragm the pump-diaphragm is obviously operated with sufficient force to propel the reagent as desired. The recess $a'$ is provided to permit the movement of the diaphragm $b$ within the casing $a$; but the circular recess $c'$ is utilized to receive an adjustable plate to regulate the movement of the diaphragms.

To regulate the vibration of the diaphragms, an adjusting-plate $j$ is inserted in the circular recess $c'$ outside the diaphragm $d$, and a screw is fitted to a gland $m$ upon the casing $c$ and provided with a stem $n$ and hand-wheel $n'$ for adjusting the same. The point of the screw by contact with the plate $j$ limits the movement of the diaphragm $d$ as desired. A stuffing-box $p$ is provided upon the gland $m$ to pack the stem $n$, and the hand-wheel is provided with a series of holes $r$ and with a screw $s$ for insertion through any of the holes at pleasure into a fixed bearing $t$ to lock the screw in its adjusted position.

I do not make any broad claim herein to the use of two diaphragms of different areas, as such construction has been claimed by one Charles H. Kendrick in an independent patent application.

My present invention relates merely to an economical and simple construction for the entire device, which I effect by combining two diaphragms with the transmitting-disk $f$, having an annular rabbet to present different areas to the two diaphragms, as set forth above.

Having thus set forth my invention, what I claim herein is—

1. The combination, with the casings $a$ and $c$, having outlet-nozzles, as set forth, of the diaphragms $b$ and $d$, adjacent to the same, the intermediate ring $e$, rabbeted upon one side to present different areas to the diaphragms, and the transmitting-disk $f$, formed with annular rabbet $f$ to present different areas to the two diaphragms, substantially as herein set forth.

2. The combination, with the casings $a$ and $c$, formed, respectively, with the recesses $a'$ and $c'$, as set forth, of the diaphragms $b$ and $d$, the intermediate ring $e$, and transmitting-disk $f$, rabbeted, as described, the regulating-plate $j$, fitted to the recess $c'$, the screw for regulating the movements of the plate, the hand-wheel $n'$ upon the stem of such screw, and means for securing the hand-wheel adjustably, as and for the purpose set forth.

In testimony whereof I have hereunto set my hand in the presence of two subscribing witnesses.

JOHN W. HYATT.

Witnesses:
   THOS. S. CRANE,
   HENRY J. MILLER.